(12) United States Patent
Jennings et al.

(10) Patent No.: US 7,042,889 B2
(45) Date of Patent: May 9, 2006

(54) NETWORK SWITCH WITH PARALLEL WORKING OF LOOK-UP ENGINE AND NETWORK PROCESSOR

(75) Inventors: Kevin Jennings, Bearna (IE); Kevin J Hyland, Dublin (IE); Vincent Gavin, Galway (IE)

(73) Assignee: 3Com Corporation, Santa Clara, CA (US)

(*) Notice: Subject to any disclaimer, the term of this patent is extended or adjusted under 35 U.S.C. 154(b) by 956 days.

(21) Appl. No.: 10/086,890

(22) Filed: Mar. 4, 2002

(65) Prior Publication Data

US 2003/0147394 A1 Aug. 7, 2003

(30) Foreign Application Priority Data

Feb. 7, 2002 (GB) .................................. 0202854

(51) Int. Cl.
*H04L 12/28* (2006.01)
(52) U.S. Cl. ....................................... 370/401; 370/392
(58) Field of Classification Search .................... None
See application file for complete search history.

(56) References Cited

U.S. PATENT DOCUMENTS 5,557,607 A 9/1996 Holden

| | | | |
|---|---|---|---|
| 6,347,087 B1* | 2/2002 | Ganesh et al. | 370/392 |
| 6,687,247 B1* | 2/2004 | Wilford et al. | 370/392 |
| 2001/0028651 A1 | 10/2001 | Murase | |
| 2002/0101867 A1* | 8/2002 | O'Callaghan et al. | 370/389 |
| 2003/0048779 A1* | 3/2003 | Doherty et al. | 370/389 |
| 2005/0141501 A1* | 6/2005 | Kadambi et al. | 370/389 |
| 2005/0232274 A1* | 10/2005 | Kadambi et al. | 370/392 |

FOREIGN PATENT DOCUMENTS

| | | |
|---|---|---|
| GB | 2328593 A | 2/1999 |
| GB | 2371705 A | 7/2002 |
| WO | WO 96/23391 | 8/1996 |

* cited by examiner

*Primary Examiner*—Duc Ho
(74) *Attorney, Agent, or Firm*—Nixon & Vanderhye P.C.

(57) ABSTRACT

A network switch which allows a network processor to process resultant data from a look-up engine while the look-up engine proceeds to deal with a subsequent packet. The look-up engine stores the resultant data in registers from which the resultant data is written back for the packet if the processor does not intervene. If the processor intervenes it acts on the resultant data, which is written back for the packet only after the processor has finished. A system of pointers and busy bits ensures that the packet is not forwarded until the look-up engine and (if required) the network processor have completed their operations in relation to the packet.

10 Claims, 7 Drawing Sheets

NETWORK SWITCH WITH PARALLEL WORKING OF LOOK-UP ENGINE AND NETWORK PROCESSOR

FIELD OF THE INVENTION

This invention relates to network switches for use in packet-based data communication systems in which packets which include address data in a header are received by a switch, subjected to a look-up to determine forwarding data for each packet and forwarded from a respective port or ports accordingly. The invention more particularly relates to network switches which include a means, usually termed network processor, which can intervene in the process of obtaining forwarding data to modify the process, and particularly to modify a port bit mask and/or header data of a packet.

BACKGROUND TO THE INVENTION

Packet-based communication systems such as those based on Ethernet Standards and others include switches, which may be either hardware or software based but are usually a mixture of hardware and software processing, which may perform switching based on either 'layer 2' (media access control) addresses or 'layer 3' (network or IP addresses) or both.

In physical terms, network switches may take a variety of forms; they may be realised on one single ASIC or a multiplicity of ASICs which are coupled together by high speed links.

Typically most if not all the processing and control blocks of a switch are realised on at least one application specific integrated circuit which may include at least some but not necessarily all the memory space required to store temporarily packets between the times of their reception by the switch and their forwarding from the relevant port or ports.

Whatever may be the specific realisation, network switches of this general kind typically perform the same basic switching process. They include a database, sometimes called forwarding database or look-up database, which is accessed in response to address data, typically a destination address in the header of a packet, in order to retrieve 'associated' or 'forwarding' data which identifies for any given packet the port or ports from which the packet or a copy thereof is to be forwarded. It is customary, when the packet is received, to place it in temporary storage, such as a FIFO defined in some respective memory space, while the header including the address data of the packet is subjected to the look-up process.

There exists a wide variety of architectures for organising the memory. FIFOs or buffer memories may be used. It is possible to store the packet and its header in contiguous memory spaces; it is also possible to store the main body of a packet separately from a header. In the present invention there is not intended to be any limitation on the specific architecture for the storage of the packets or the method by which they are stored in and retrieved from memory. Preferably received packets are in at least one 'receive' queue (which may be composed of the packets themselves or pointers to memory locations) and at least one 'transmit' queue. There may be a 'receive' queue, held in a FIFO and a 'transmit' queue, in a FIFO, for each port of the switch. Broadly, the invention described herein will act on address data normally contained within the header of the packet as well as certain associated data, which may be presented by a status word stored with or in a directly associated manner with the header of the packet; where and how the remainder of the packet is stored is a matter of preference.

Look-up databases can be organised in a variety of different ways. Some databases employ hashing on address data or selective parts of it to provide access to entries which include pointers to the respective associated data. If hashing is employed then it is necessary to compare an identified entry with the original address data to ensure there is a match. Methods exist for providing linked lists in hashed controlled look-up databases to cope with the phenomenon that different addresses may hash to the same word value. Other forms of look-up database include a trie database which operates on segments of a key, consisting of all or part of the address data for the packet, and at each stage of the search there is a pointer to a block of entries which are distinguished by the next section of the key, and so on. At any stage of the trie search the search may terminate with a pointer to the required 'associated' or 'forwarding' data. Trie searches are fully described in European patent application EP-0551243-A2, U.S. Pat. No. 6,041,053 and so on. Other forms of database employ binary trie searching or combinations of different search facilities, such as for example a cache memory for frequently occurring addresses, as well as a trie search facility.

Whatever the specific form of look-up, the search will normally produce a search result including a port bit mask wherein for each bit that is set in the bit mask the relevant port must receive the packet or a copy thereof. The search may use either the 'layer 2' (media access control) or 'layer 3' (network protocol) information in the packet and may also employ VLAN identification information. Normally, in addition to the address and other information employed for the look-up, the look-up engine is provided with a status word which indicates the result of some processing done on the packet before it arrives at the look-up engine. The look-up engine may modify the status word to provide information to the transmit side, that is to say that part of the switch which is responsible for forwarding a packet from the relevant port or ports. The status word may be modified so as, for example, to flag a change to the media access control destination address, to cause recalculation of the check sum or cyclic redundancy code and so on. After the look-up is performed, the look-up engine may drive the bit mask through what is termed 'post-processing logic'. This is provided in modern switches in order to cope with (for example) the complexity of trunking wherein a stack of switches is connected to another switch or stack of switches by means of a multiplicity of links. Special rules relating to the cascade connections, namely the means of conveying packets from one unit to another in a stack of units managed as a single entity, various discarding rules and so on. The result of post-processing is normally to produce a modified version of the port bit mask which is then passed on to a control, normally termed a link engine, which controls the passage of the packet to the required destination port or ports (i.e. to transmit queues for such ports).

Look-up engines, particularly but not exclusively those in hardware form, tend to be optimised for particular operating conditions. Nevertheless when switches are used for some particular purposes, such as for example server load balancing, the look-up and post-processing operations need to be modified because the particular purpose may involve changes to the status word, changes to the MAC address of a packet and so on. Furthermore it may be desirable to perform selective analysis of the packets, for example those from a particular host or to a particular destination. It is therefore desirable in a variety of circumstances to allow some parallel processing of a packet header so that the switch can be used for particular purposes or at any rate rendered more versatile, without requiring modification or reprogramming of the look-up engine. Although it is possible to provide a link between the look-up engine and the action of a network processor by means of a flag which will allow the network processor to intervene in the look-up and forwarding process, so that the processing of a packet by the look-up engine is not finally completed until both 'look-up' and 'network processing' have been completed, such a linking of a look-up engine and network processor is undesirably restrictive if, for example, only a fraction of the packets need 'network processing' and/or the action of the network processor consumes more time than the usual look-up process. In both cases the ordinary action of the switch is slowed down.

SUMMARY OF THE INVENTION

The present invention has a general object of improving the efficiency and the speed of network switches by means of a convenient and versatile organisation of the parallel processing controlled by a look-up engine and a network processor.

The present invention provides a switch in which, as far as packets that do not require processor intervention are concerned, a look-up will proceed on generally familiar lines. However, if processor intervention is required, the look-up engine will provide the necessary forwarding data, i.e. the search result such as a port bit mask and other data such as packet type, destination address and so on, to a register block so as to enable the processor to act on this forwarding data independently of the look-up engine. The switch may have a control system by means of which a packet will not be forwarded to a transmit FIFO, and therefore not forwarded from the switch, unless either processor intervention has not been required, or, if processor intervention has been required, the action of the processor on that packet has been completed. The action of the processor need not be confined to or even concern the search result, and may be concerned with analysis rather than modification of the forwarding data.

Various features of the invention will become apparent from the following detailed description with reference to the accompanying drawings.

DETAILED DESCRIPTION OF A PREFERRED EMBODIMENT

General Description

A network switch in this particular embodiment is intended to receive and forward addressed data packets that conform to an Ethernet transmission protocol, particularly IEEE Standard 802.3 (December 1998). Packets according to that protocol normally have a 'start of frame' sequence followed by a header including a 48-bit destination address field (which also indicates whether the packet is unicast, multicast or broadcast), a 48-bit source address, network address data including a network destination address and a network source address, VLAN data and other fields indicating the packet type. After the header is the payload and a cyclic redundancy code field. The header is the part that is relevant to the present invention and of the header the particularly relevant parts will be the MAC destination address and the MAC source address.

Figure 1:
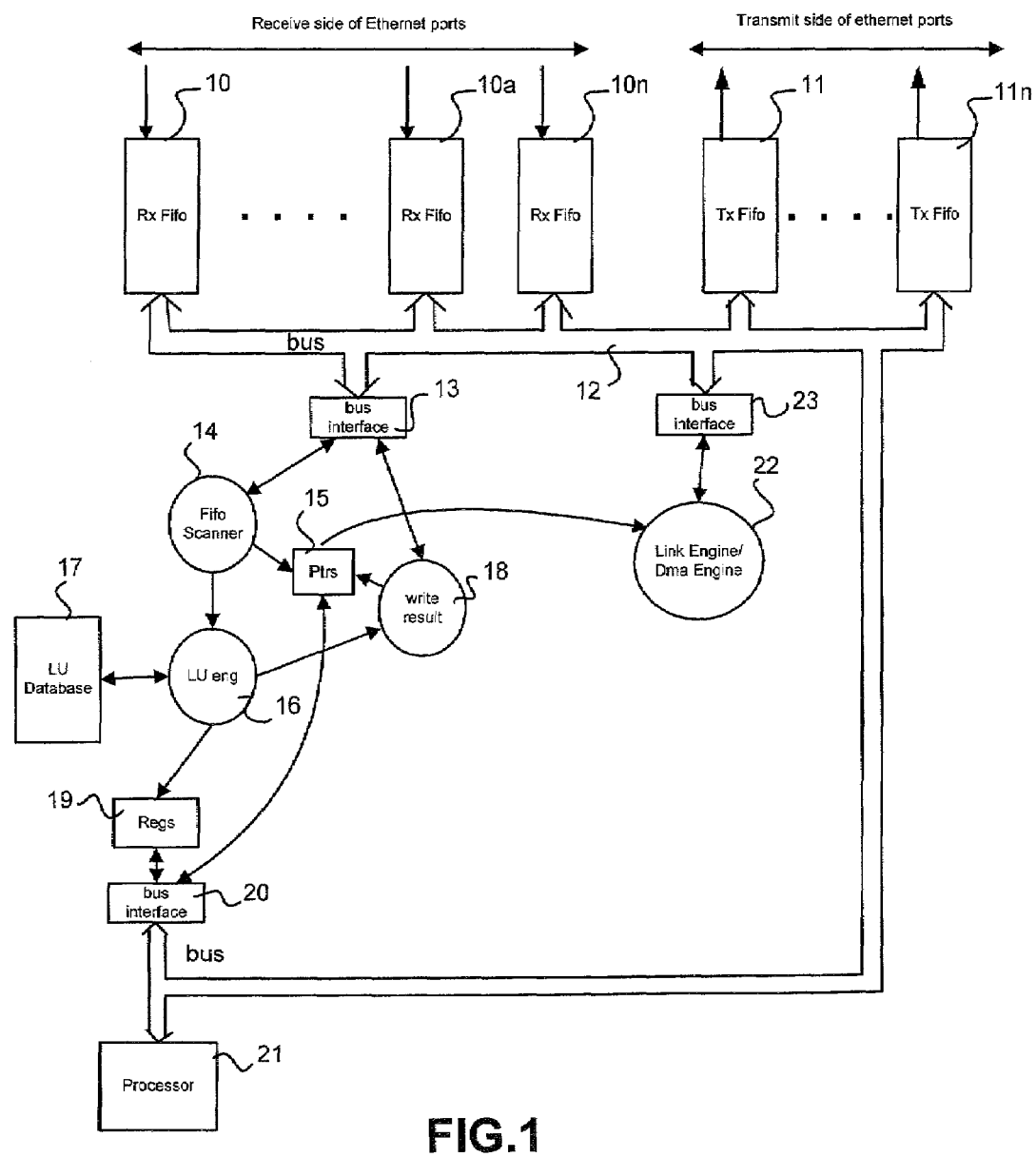
FIG. 1 is a schematic diagram illustrating the relevant features of a switch which constitutes one embodiment of the present invention.

FIG. 1 of the drawings shows in a simplified schematic form the relevant parts of a network switch according to the invention. For convenience the switch will be described as a 'layer 2' switch which will have recourse to the media access control addresses in an incoming packet to perform a look-up, as described later, so as to obtain the forwarding data, including a destination port bit mask, enabling the packet to be forwarded from a port or ports of the switch. The same configuration of switch is also applicable, for example, to 'layer 3' or network address switching.

For the sake of simplicity, the individual ports are not shown in the switch. Each port, in accordance with common practice, has in this embodiment a receive (RX) side and a transmit (TX) side each associated with a respective memory space, particularly a FIFO. The drawing illustrates receive FIFOs (RX FIFOs) 10, 10a to 10n (there being n ports for the switch) and transmit FIFOs 11 to 11n. Thus for example a first port will have a receive side or channel by means of which a packet received at the respective port will be initially stored in a receive FIFO 10 and packets intended for dispatch by that port will be temporarily stored in transmit FIFO 11. Likewise, port n has associated with it a receive FIFO 10n and a transmit FIFO 11n.

The stores for packets could alternatively be constituted by a single memory in which at least one 'receive' queue and at least one 'transmit' queue are defined. For the sake of simplicity, such commonplace features of switches such as the physical layer and other layers by which the packet's format is translated between the format relevant to the particular transmission medium and a format independent of the transmission medium are omitted.

The FIFOs 10 to 10n and 11 to 11n may be specific discrete FIFOs but may, in accordance with known practice, be defined in a respective portion of random access memory space. Very typically data is read into each FIFO at a location determined by a progressive head pointer and read out of a FIFO by a progressive tail pointer, as will be more particularly described with reference to FIG. 2. These pointers step through the relevant memory space and recycle when they come to the end of the respective space. Typical examples of FIFOs defined in an allotted space in random access memory or otherwise are given by GB patent 2349312 and published application GB-2360168.

For the conveyance of packet and other data between the receive FIFOs and the transmit FIFOs and also to and from a processor is a bus system which is in any suitable form and is illustrated by the schematic bus 12.

The bus 12 is coupled by way of a bus interface 13 to a FIFO scanner 14 which will be more particularly described hereinafter. The general purpose of the FIFO scanner is to retrieve header data for each received packet (in any appropriate order). For this purpose it scans the receive FIFOs in turn and for each FIFO, unless it is 'busy', obtains data from the header of a packet and provides that data or some of it to a look-up engine 16. The FIFO scanner 14 operates in conjunction with a 'pointers block' 15 which, as will be seen, co-ordinates the operation of the FIFO scanner, a processor 21 and a link engine 22.

The pointers block 15 stores 'look-up' (LU) pointers for each of the RX FIFOs as well as bits which indicate whether the RX FIFOs are 'busy' or not.

Under the control of the FIFO scanner 14 is a look-up engine 16 which, again as more fully described later, will have recourse to a look-up database 17 to obtain forwarding data. The look-up engine co-operates with a 'Write Result' block 18 and a 'Register' block 19. The main purpose of the Write Result block 18 is to insert in a status word for a packet in the receive FIFO a result (including forwarding data) obtained from the look-up engine. The purpose of the 'Register' block 19, as more fully described later, is to store header data and forwarding data for use by the processor, so as not to delay the operation of the look-up engine in respect of the next packet. The Register block 19 is coupled by way of a bus interface 20 to the bus 12 and the 'network' processor 21.

The 'Pointers' block 15 is also connected to a Link Engine/direct memory access engine 22 which is coupled by way of a bus interface 23 to the bus 12 and thence to the receive and transmit FIFOs. This Link Engine controls the transfer from the receive side (FIFOs 10–10n) to the transmit side (FIFOs 11–11n) of packets of which have been duly processed by the look-up engine and (if required) by the processor 21.

As mentioned previously, it is desirable to be able to perform additional processing of a packet header. This processing may be selective in the sense that it need be performed only in respect of packets received at a particular port of a switch or may be performed on a stream of packets received from a particular source. The present invention is particularly directed to the provision of controllable network processing of packets by allowing, controllably, a processor to intervene in a look-up and forwarding process.

In a practical form of the invention, the result of the look-up process is inserted in Register block 19, which may store all the relevant header information from a packet, such as destination address, source address, ether-type, VLAN tag, IP header and so on and the result from the look-up engine when it is complete. The associated processor 21 can operate on this information or a selected portion of it while the look-up engine will continue with the look-up of a packet from the next port. This allows the processor to perform look-up for, or analysis, or modification of all packets destined for or received from a particular port but will not affect the forwarding rate of packets through other ports.

Thus the invention may cure a problem in multi-port/single processor architecture with receive and transmit FIFOs. It is also applicable in a system where there is a processor on every port and a descriptor based queuing architecture is being used. In this case there may be a particular stream of packets being received on a port, i.e. from a particular host, which the processor may be interested in analysing. This stream may only be 10% of the traffic being received on a port though it may take 100% of the processor bandwidth to analyse the stream. Effectively in parallel the other 90% of the traffic can be forwarded by the look-up engine without any intervention by the processor.

Linkage of Look-up and Network Processing

The description which follows indicates the operation of the individual elements 14 to 19 which enables the switch to perform look-up and forwarding processes in the manner of a normal switch but includes temporary storage, represented by the register block 19, which makes available forwarding and/or header information of a packet for possible use by the network processor 21 while the look-up engine goes on to examine another packet. This scheme is particularly suitable where processor intervention is required only on a small proportion of the packets, such as for example packets received on only one port out of a multiplicity of ports. The various elements 14 to 19 are organised so that where intervention by the processor is required the final write-back of forwarding data for the packets is delayed until the processor has performed the necessary additional processing on a relevant packet. However, since the control system is linked to the packet storage it is convenient to describe that (by way of example) first.

Packet Storage

Figure 2:
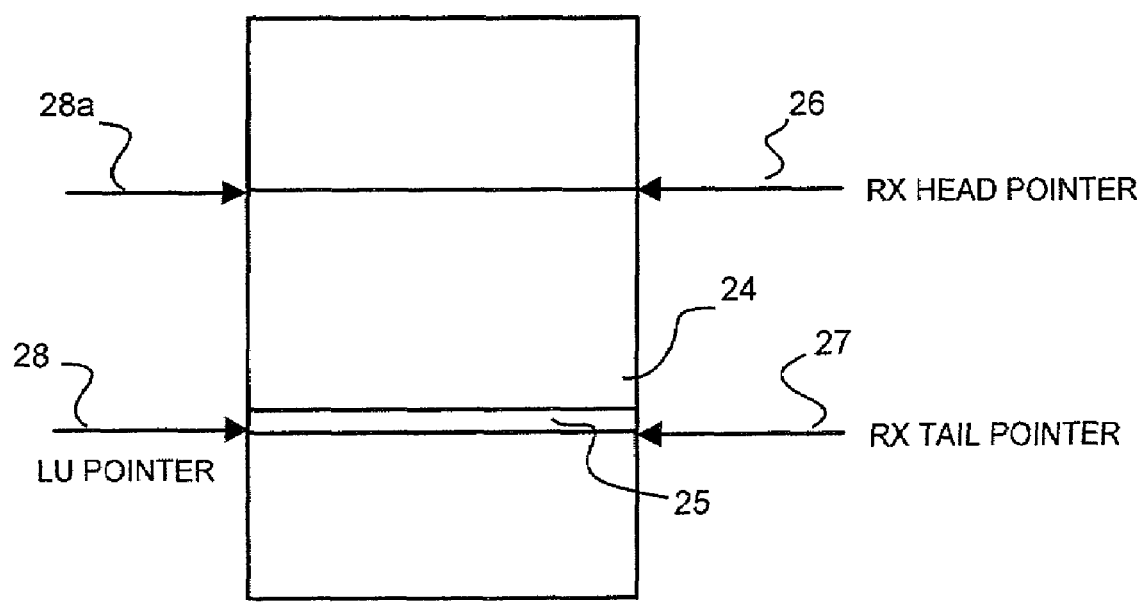
FIG. 2 illustrates part of a FIFO store and a packet stored therein.

FIG. 2 illustrates schematically part of a FIFO 10 defined in random access memory and a schematic representation of a single packet 24 and its status word 25. The FIFO has an RX head pointer 26 which indicates the location for writing the start of the next packet to be received and an RX tail pointer 27 which indicates the next packet (in this case packet 24) which subject to completion of processing can be read out of the FIFO. Pointers 26 and 27 recycle through the available memory space. Also shown in FIG. 2 is a LU pointer which is actually stored in pointers block 15. If this pointer indicates position 28, the packet (24) is available for look-up. If the LU pointer indicates position 28a (i.e. is equal to the RX head pointer) it signifies that look-up has not been performed and therefore the FIFO scanner should examine the next packet (in another FIFO).

The FIFO Scanner

Figure 3:
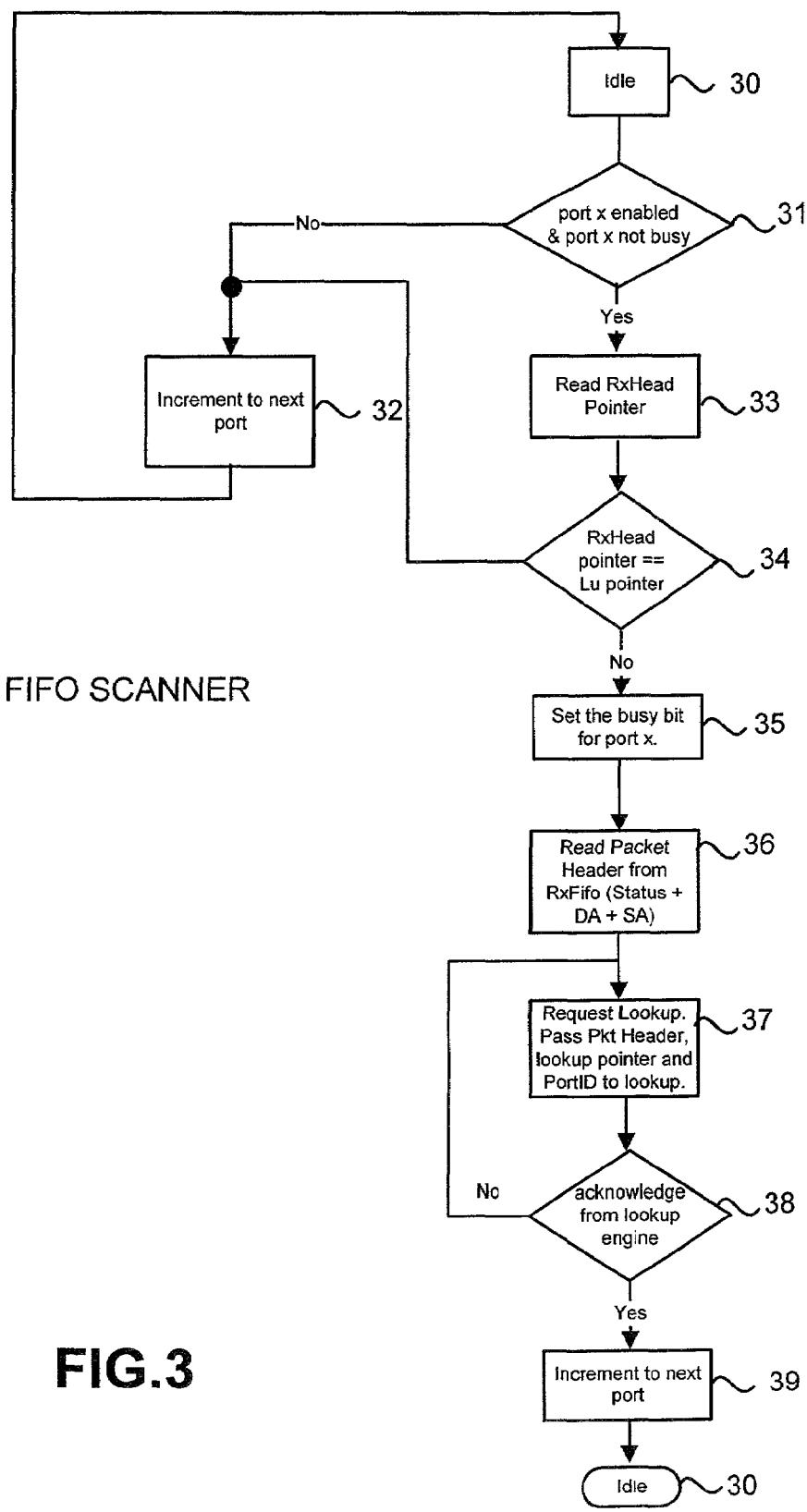
FIG. 3 is a diagram illustrating a progression of states of a FIFO scanner.

FIG. 3 is a state diagram showing the operations of the FIFO scanner 14. As previously indicated, the general purpose of the FIFO scanner is to pass data (if able to do so) from the receive FIFOs in turn to the look-up engine.

The FIFO scanner has an idle state 30 which it leaves provided that a given FIFO is enabled and that port is not busy. A port (including its FIFOs) is normally 'enabled' when the respective physical layer device (PHY) indicates that there is a link between the port and a remote device. For convenience, since each FIFO is associated with a respective port, the FIFO is termed 'port x'. If these conditions are not met the FIFO scanner increments (state 32) to the RX FIFO for the next port (according to a scanning schedule which may be 'round-robin' but which may be more complex, having regard (for example) to the relative states of fullness of the FIFOs).

If the RX FIFO port is enabled and is not busy, FIFO scanner in state 33 reads the RX head pointer 26 in the respective RX FIFO. The RX Head pointer is read across the bus. The FIFO scanner passes the port ID to the pointers block 15, which passes back to the scanner the LU pointer and the 'busy' bit for that port. If the RX Head pointer is pointing to the same location as the look-up pointer (28) the operation is not appropriate and the FIFO scanner increments to the next port (state 32). If the RX head pointer is not equal to the look-up pointer, the FIFO scanner sets the 'busy' bit for the port (state 35). It then reads the packet header from the RX FIFO. Preferably it will read the status word as well as the MAC destination address (DA) and MAC source address (SA) from the packet and other header data as desired.

State 37 is the state in which the FIFO scanner sends a look-up request to the look-up engine 16. It passes the packet header, the look-up pointer and the port identification (port ID) to the look-up engine. Provided it receives an acknowledgement from the look-up engine (state 38) the FIFO scanner will then increment to the next port, state 39. This state is in essence the same as state 32 but is shown separately for convenience.

Look-up Engine

Figure 4:
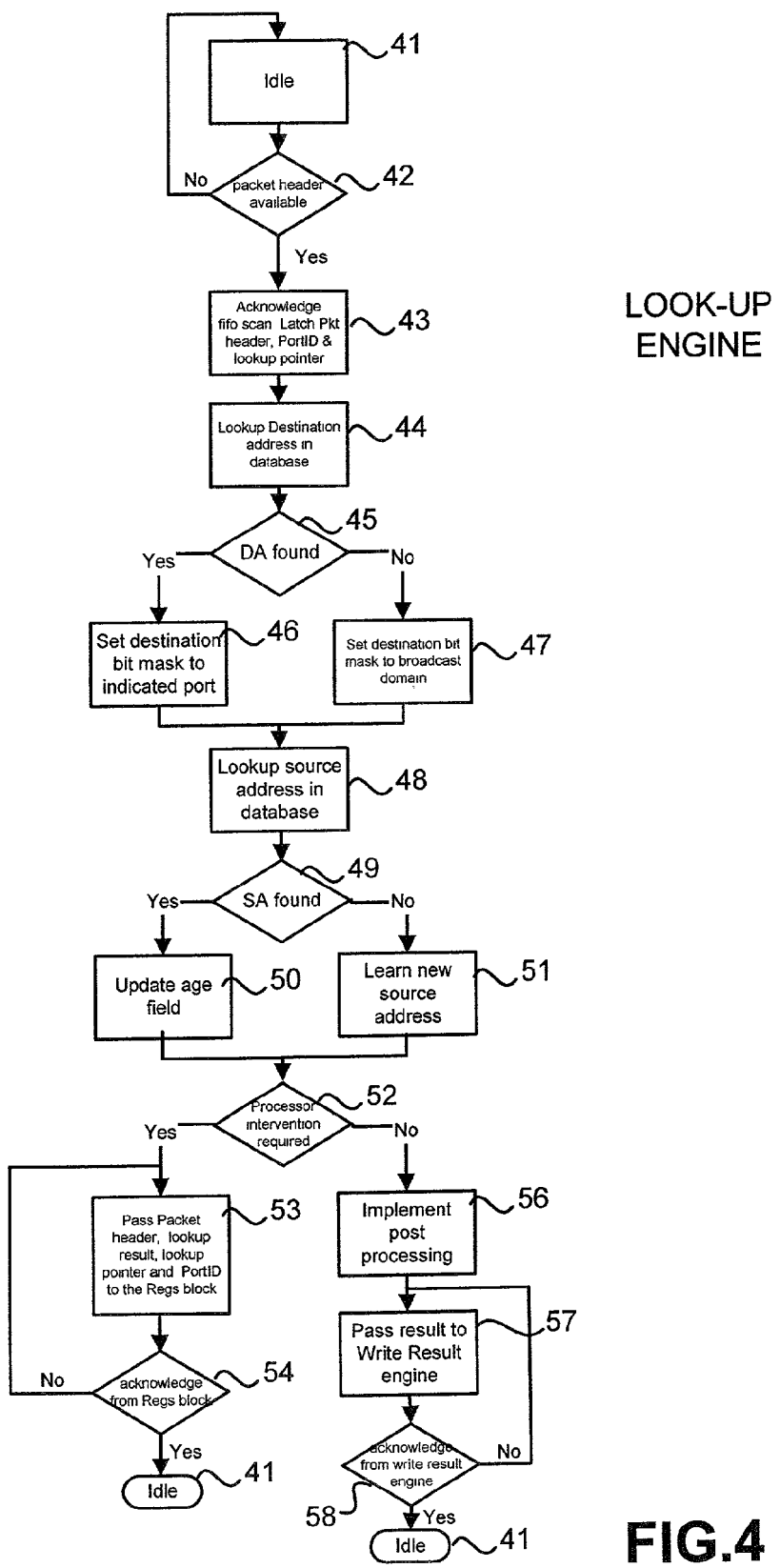
FIG. 4 is a diagram illustrating the progression of states of a look-up engine.

FIG. 4 is a state diagram for the look-up engine 16.

Look-up engine 16 has an idle state 41 in which it will remain unless and until a packet header is available (state 42) from the FIFO scanner 14.

When a packet header becomes available, the look-up engine will acknowledge the FIFO scanner and latch (in a suitable register) the packet header, the identification of the port (i.e. FIFO) from which the packet has come and the look-up pointer all as supplied by the FIFO scanner.

State 44 denotes the look-up for the destination address in the look-up database 17. If the destination address is found (yes in state 45), the destination bit mask, obtained from the look-up database will be sent to the indicated port. If the destination address is not found in the database, the destination bit mask will be set to the broadcast domain, since it will be necessary to 'flood' the packet to obtain the destination address for it.

The look-up engine will, in accordance with ordinary practice, also perform updating of the database by determining whether the source address of the packet is in the database (state 48) and, if so, ('yes' in state 49) to update the age field. If the source address is not found in the database then the source address will be stored in the database (state 51) along with an identification of the port. This is the known process of providing forwarding data for packets which are destined for that source address.

The look-up engine differs from conventional engines in that at the present stage it is determined whether intervention by the processor is required (state 52). If intervention by the processor is required then the look-up engine will pass the packet header, the look-up result, the look-up pointer and the port identification to the Register block 19 as indicated by state 53. When it receives an acknowledgement from the Register block 19 (state 54) the look-up machine will revert to the idle state 41.

Various tests may determine whether processor intervention is required. A simple example is that all packets received from (or to be sent to) a particular port will require intervention. Other tests are that all packets which have a particular MAC address or IP address or a particular QOS (quality of service) will need intervention.

If however no processor intervention is required, then the look-up engine may implement post-processing, state 56, and pass the result of the post-processing to the Write Result engine (state 57) and, on receipt of an acknowledgement from the Write Result engine (state 58) revert to the idle state 41.

As is noted earlier, this bifurcation, at state 52, of the look-up engine's process is one of the features which enables in effect parallel processing by the look-up engine and the processor.

In the current example, only one packet can have its relevant data stored in the register block at a time and if therefore the processor operates more slowly than the look-up engine, the through-put may be affected by the rate at which the processor can operate. Thus for example if there is a single processor which operates at a tenth of the rate of the look-up engine, the packet through-put will be diminished if the proportion of packets which require intervention by the processor exceeds a proportion, in this case 10% of the packets handled by the look-up engine. This possible difficulty can be overcome by providing additional processors with additional registers; for example the register block may consist of a multiplicity of registers in which the look-up engine will pass the look-up result (if required to do so by state 52) on (for example) a round robin basis. There would be, obviously, additional means required for ensuring absence of conflict when writing back from the register block to the other units.

Write Result Block

Figure 5:
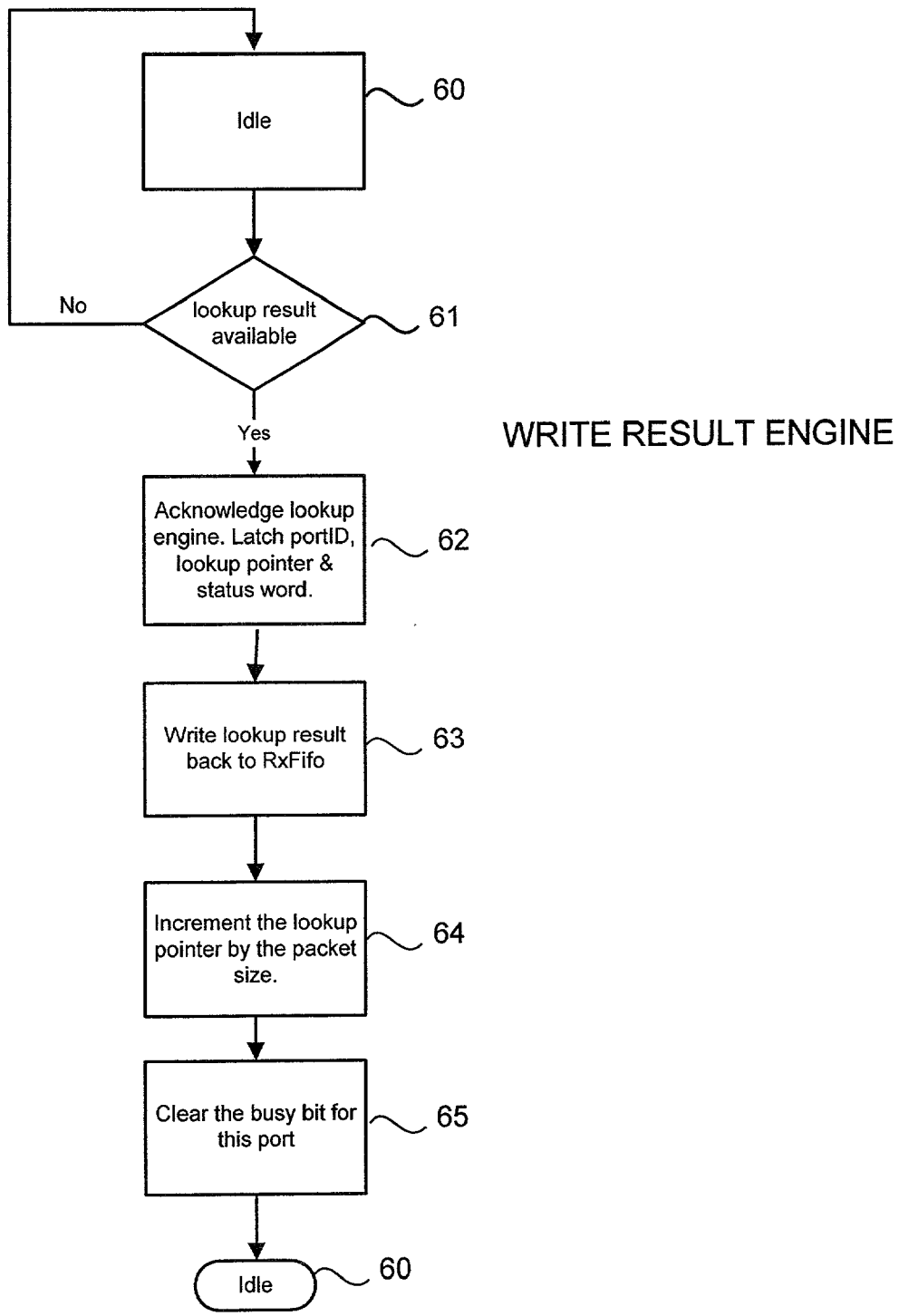
FIG. 5 is a diagram illustrating the progression of states of a write result state machine.

FIG. 5 is a state diagram for the operation of the write result block 18 in FIG. 1.

The write result machine is in an idle state (60) unless a look-up result is available from the look-up engine 16, as denoted by state 61. This look-up result comes from state 57 of the look-up engine and so will not be provided if the network processor has intervened. When the look-up result is available, the Write Result machine will send an acknowledgement to the look-up engine, latch the port identification, the look-up pointer and the status word all as obtained by and supplied to the Write Result machine to the look-up engine. The Write Result engine will write the look-up result back to the relevant RX FIFO (identified by the port ID) as in state 63. It will also increment the look-up pointer stored in pointers block 15 by the packet size, state 64, and clear the busy bit for this port (state 65) before finally reverting to the idle state 60. At this point the LU pointer is not equal to the tail pointer and the busy bit is clear; and so the packet of which the start is located by the tail pointer can be read out of the RX FIFO.

Pointers Block

Figure 6:
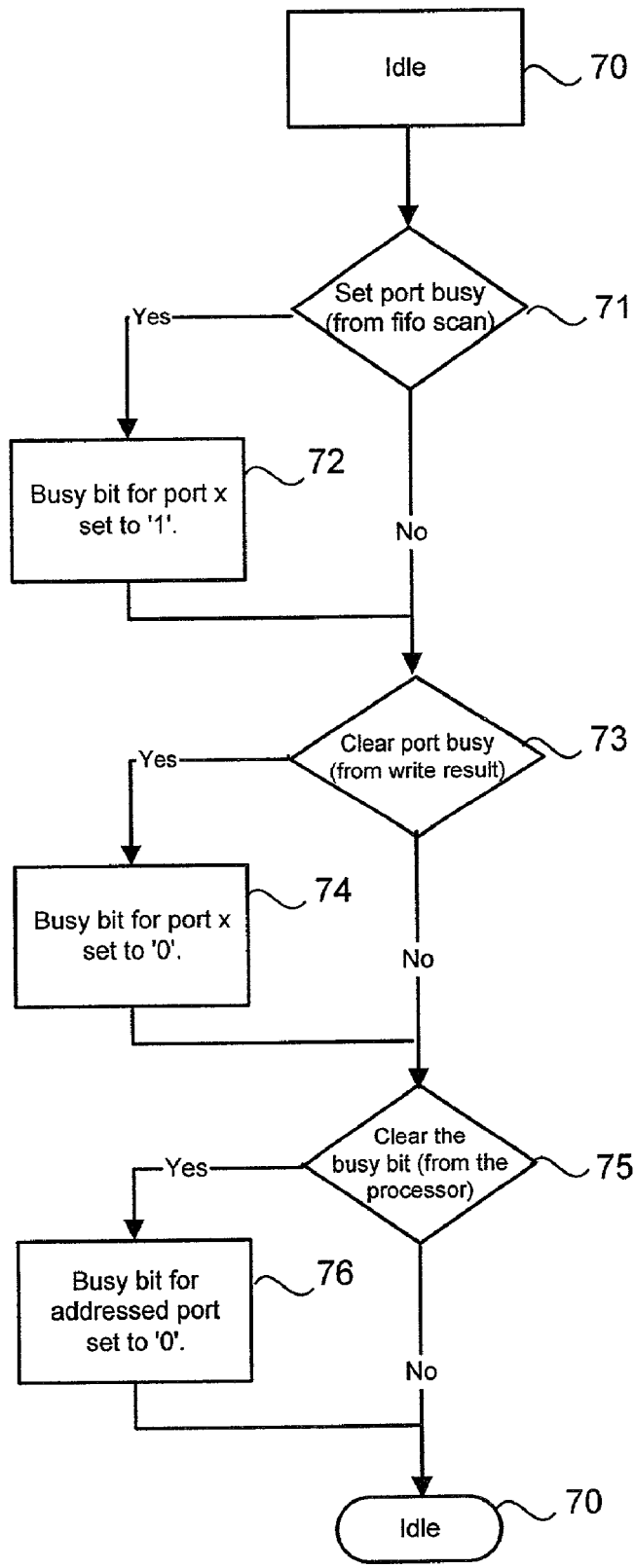
FIG. 6 is a diagram illustrating the progression of states of a pointers block.

FIG. 6 of the drawings is a state diagram illustrating the operation of the pointers block 15 in the switch shown in FIG. 1. In essence the Pointers block is a register with a bit for each port with associated state machine features to control the setting of these bits in accordance with inputs from the FIFO scanner, the write result engine and the processor. It also has, as previously explained, registers for the LU pointers. These are accessed using the respective Port ID by the FIFO Scanner and are updated by the write result engine.

More particularly, from an idle state 70 the machine at state 71 will set a specific port busy bit at the behest of the FIFO scanner, state 72. In state 73 the pointers block will clear a busy bit for a given port in accordance with an input from the write result engine, states 73 and 74. At state 75, the busy bit for an addressed port may be cleared at the behest of the processor, states 75 and 76.

Pointers block has states 75 and 76 in addition to states 73 and 74 because, it may be recalled, there will be a write result in the absence of processor intervention but a signal from the processor if processor intervention has been required and the processor produces the final result.

Register Block

Figure 7:
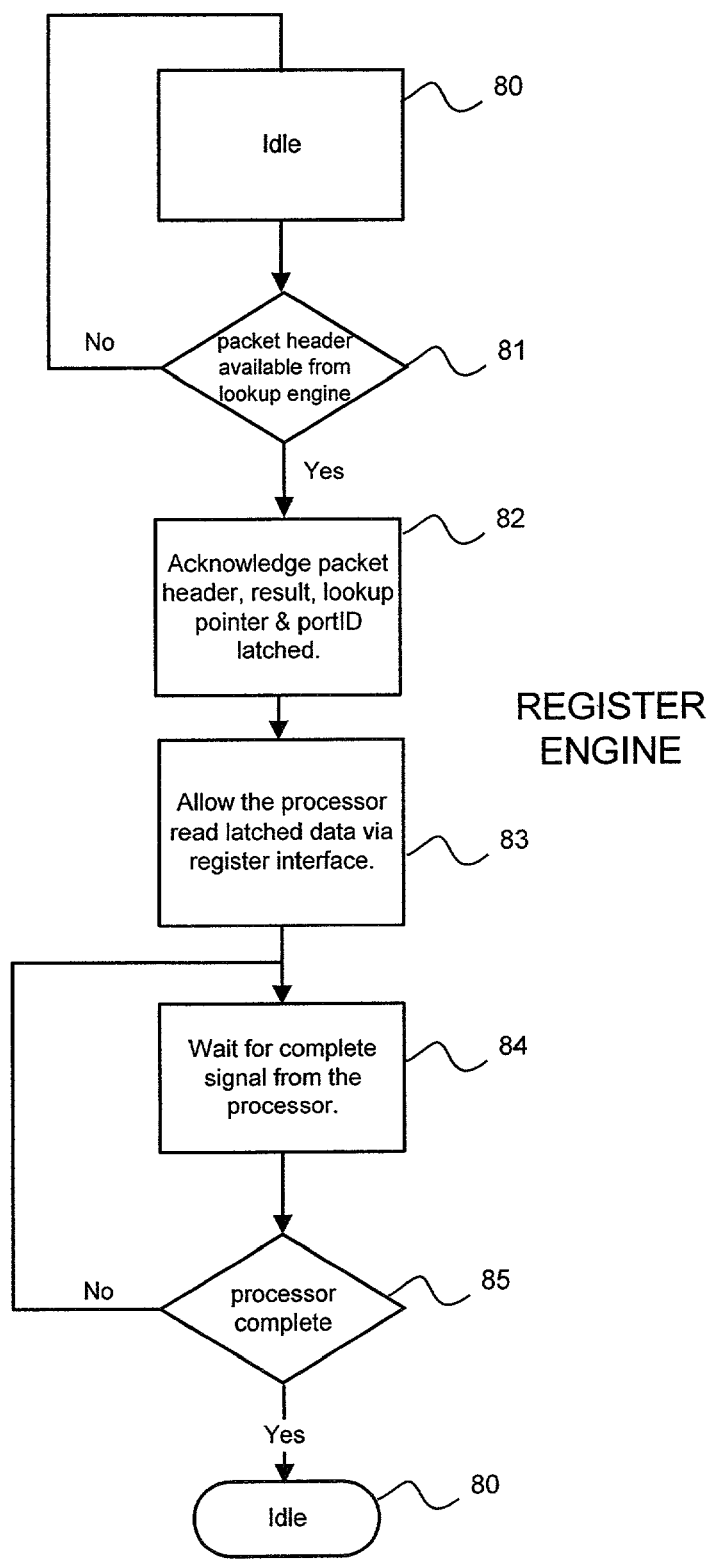
FIG. 7 is a diagram illustrating the progression of states of a register block.

FIG. 7 is a state machine for the operation of the Register block 19 in FIG. 1. Register block has an idle state 80 until there is a packet header available from the look-up engine, as indicated by state 53 (FIG. 4). The Register engine will acknowledge the packet header, result, look-up pointer and will latch these and the port ID into respective registers (state 82). On completion of the write operation, register block allows (state 83) the processor to read the latched data by way of the interface 20. It will wait (state 84) for a completion signal (state 85) from the processor before reverting to the idle state.

Processor

The processor 21 may perform any desired processing, such as modification of a destination bit mask, changing a destination MAC address for the packet of which the status word and header information are for the time being held in Register block 19, analysis of a particular packet type or analysis of packets going to or coming from a selected address or network and so on. In particular, the engine might determine that copies of certain packets should be sent to a particular port. A wide variety of network processing is available owing to the parallel, but co-ordinated operations of the look-up engine and the processor.

When the processor has completed its operation it will signal by way of the interface to the Register engine (c.f. state 85) and to the Pointers block (state 75). By means of the bus 12, and the Port ID and the look-up pointer the processor will have written back the modified status word and header information to the respective packet before the 'busy' bit is cleared.

Link Engine

No state diagram is given for this because the operation is peripheral to the association of the look-up engine and the network processor. In reality the link engine makes the link between the receive FIFOs and the transmit FIFOs and operates at appropriate times to transfer packets, on which a look-up has been performed and for which the busy bit has been cleared from a receive FIFO to a transmit FIFO.

More particularly the link engine includes a FIFO scanner, a direct memory access (DMA) engine, a FIFO update engine and another pointers block. This FIFO scanner compares the LU pointers with the RX Tail pointers and determines if a look-up has been completed on a packet. It sets a 'busy' bit for a receive port. Then for every port for which the packet is destined the FIFO scanner determines if there is space in the transmit FIFO by reading the TX Tail pointer and comparing it with the TX Head pointer for that point. If there is space the FIFO scanner passes the relevant information to the DMA engine which transfers the packet from the receive FIFO to the transmit FIFO.

When the DMA engine has finished the transfer it passes the packet information to the FIFO update engine, which updates the TX Head pointer in the respective transmit FIFO control. It also clears the busy bit for the receive port and updates the receive FIFO Tail pointer. The pointers block in the link engine stores the 'busy' bits and the RX Tail pointers.

In practice the operation of the link engine is more complex than the foregoing indicates because it has to take into account broadcast, multicast and filtered packets, but the complexity is not relevant to the operation and co-operation of the look-up engine and the processor.

The invention claimed is:

1. A network switch for receiving and forwarding data packets that include header data containing address information, comprising:
    (a) a look-up engine disposed to perform a look-up in a database so as to obtain for each packet in a succession of packets respective resultant data which comprises forwarding data for the packet;
    (b) a store; and
    (c) a network processor for processing data in said store; wherein said switch:
        (i) determines whether intervention of the network processor in respect of said packet is required;
        (ii) in the event that such intervention is not required provides said resultant data for said packet;
        (iii) in the event that said intervention is required causes storage of said resultant data in said store;
        (iv) allows said processor to process said resultant data to provide processed resultant data; and
        (v) provides said resultant data for said packet after the completion of the processing of said resultant data by said network processor.

2. A network switch according to claim 1 wherein said processor modifies said resultant data.

3. A network switch according to claim 1 further comprising:
    at least one memory for at least header data of received data packets; and
    means for reading out header data of a packet from said memory for use by said look-up engine, said memory receiving for said packet said resultant data.

4. A network switch according to claim 3 and further comprising a control system which prevents forwarding of a data packet until said resultant data has been stored in the memory for said data packet.

5. A network switch according to claim 4 wherein said memory comprises a multiplicity of FIFO stores and wherein said control system provides an identification of a FIFO store as 'busy' on read-out of header information from that FIFO store to the look-up engine and cancels said identification when the look-up engine provides the resultant data in the absence of intervention by the network processor and cancels the identification when intervention by the network process is completed.

6. A network switch according to claim 5 wherein and further comprising a link engine which causes read-out of a packet from a FIFO when a respective look-up has been performed and the said identification has been cancelled.

7. A network switch according to claim 5 wherein each FIFO store is associated with a head pointer indicating a location into which data can be written to the FIFO store, a tail pointer indicating a location from which data can be read out of the FIFO store and a look-up pointer indicating the progression of look-up in respect of packet data in the FIFO store.

8. A network switch for receiving and forwarding data packets that include header data containing address information and including:
    (a) a database containing entries relating address information to forwarding data for packets;
    (b) a look-up engine disposed to perform a look-up in said database so as to obtain for each packet in a succession of packets respective resultant data which includes forwarding data for the packet; and
    (c) a network processor;
    wherein said look-up engine determines whether intervention of the network processor in respect of said packet is required and if so stores said resultant data for use by said network processor and performs a look-up in said database in respect of another packet while said network process performs processing in respect of said resultant data of said packet.

9. A network switch according to claim 8 wherein said network processor modifies said resultant data.

10. A network switch according to claim 9 and further comprising at least one memory for at least header data of received data packets; means for reading out header data of a packet from said memory for use by said look-up engine, said memory receiving for said packet said resultant data; and a control system which prevents forwarding of a data packet until said resultant data has been stored in the memory for said data packet.

* * * * *